Inventor,
Frank Whittle
By,
Loyd Hall Sutton
Atty.

Patented Mar. 23, 1948

2,438,426

UNITED STATES PATENT OFFICE 2,438,426

CENTRIFUGAL COMPRESSOR

Frank Whittle, Rugby, England, assignor to Power Jets (Research and Development) Limited, London, England Application November 24, 1942, Serial No. 466,804
In Great Britain December 19, 1939

Section 1, Public Law 690, August 8, 1946
Patent expires December 19, 1959

5 Claims. (Cl. 230—128)

This invention relates to centrifugal compressors or pumps.

The object of this invention is to enable the effectiveness of a given machine to be improved by increasing the volumetric capacity in proportion to size and efficiency, whilst achieving simplicity of construction and ease of manufacture.

It is to be understood that though the invention will be described in connection with air compressing, it may be used with other fluids.

The invention is based on a recognition of the fact that the limit is set to the volumetric capacity of a centrifugal compressor by the relative velocity at the maximum diameter of the rotor vane entry edges, and that by imparting to the working fluid prior to its engagement by the rotor vanes pre-whirl which is positive (i. e., in the same sense as the rotation of the rotor) and is of free vortex form in which the whirl component of velocity is inversely proportional to the radius, and by matching the impeller to this condition, the said relative velocity can be reduced, a larger intake eye used than otherwise would be possible, and greater volumetric capacity obtained without giving rise to losses which would impair efficiency.

These requirements are met, in accordance with the invention, by the provision of a centrifugal compressor having fixed intake guide vanes of uniform cross-sectional form and with constant entering and leaving angles throughout their length, so disposed as to impart whirl to the fluid flowing between them in the same rotational sense as that of the impeller, these guide vanes being followed downstream by an intake passage (or passages in the preferred case) which is initially radial for inward flow of air and finally axial to lead the fluid to rotating guide blades formed by extensions of radial impeller blades, such extensions comprising blades the leading edges of which have least pitch (i. e., are axial or more nearly axial) at their root ends and have progressively increasing helical pitch angle at increasing radii and this angle at any radius along a blade being such that the fluid is incident to the guide blades at little or no angle of attack in design conditions of operation, on the basis that the whirl component of velocity of the fluid entering the impeller by reason of the guide vanes and intake passage form, is caused to be inversely proportional to radius. In this connection it is to be noted that the radial-axial form of the intake passage plays a definite part in producing the required differential whirl at different radial stations in the plane of the impeller entry since (neglecting losses such as skin friction) the angular momentum of the whirl given by the product of mass, whirl velocity and whirl radius remains constant. Since the mass is constant, the value of the whirl component at stations across the flow will vary in the sense of increasing the whirl component with reduction of whirl radius, and the maximum increase in whirl velocity will be at the smaller radius of the impeller eye. As well as taking into account the whirl component of velocity of the entering fluid, account is of course also taken of the increase of linear speed with radius, of the rotating guide blades. The invention is deemed to have its greatest value in its application to compressors having bilateral intakes in the form of annular intake passages coaxial with the operational axis of the compressor and symmetrical about the plane of rotation of the impeller.

Where rotating guide blades are formed by the operation of bending of impeller blades from the axial-radial plane, it may be necessary for reasons of stress and difficulty of manufacture to leave them unbent at the root and it is consequently a subsidiary feature of the invention that the rotating guide blades have a zero angle (i. e. are axial) at their least radius.

Where rotating guide blades alone are used the volumetric capacity of a high speed impeller is limited by the condition that the tips of the rotating guide blades should not engage the relative flow at a velocity near the local speed of sound. This condition limits the outer radius of the intake eye. The purpose of this invention is to use such a combination of fixed and rotating guide blades as to permit of the use of a larger impeller eye and to ensure that the rotating guide blades meet the entering fluid at all radii at a small or no relative angle of attack without a large reduction of work capacity. The greater efficiency of the intake guide blades combined with the great increase of volumetric capacity, in proportion to size achieved by this invention is expected to make possible a substantial increase in adinabatic efficiency.

The invention is more fully described with the aid of the accompanying drawings, which relate to a centrifugal air compressor of the bilateral intake type.

Figure 1:
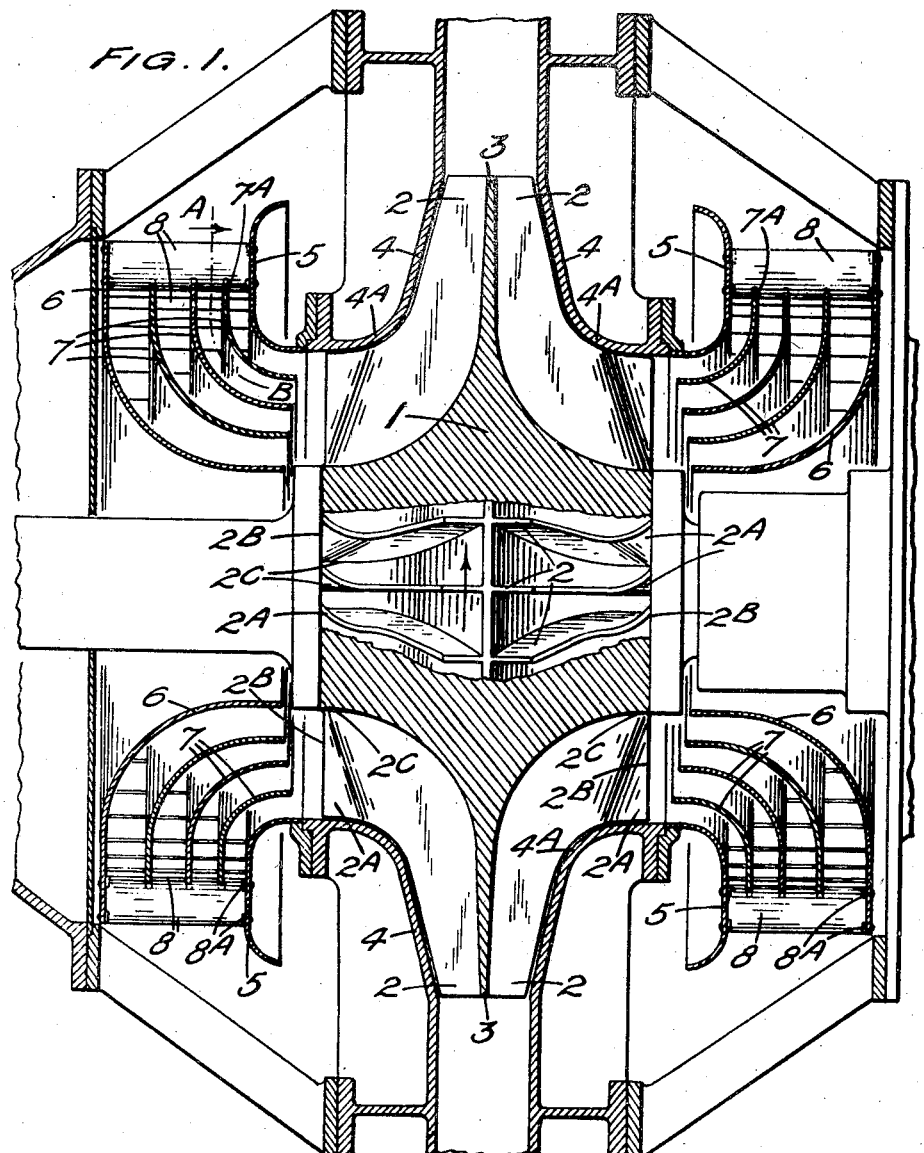
Figure 1 is a representation of such an impeller, so far as the construction is relevant to the invention, in section through the axis.
Figure 2:
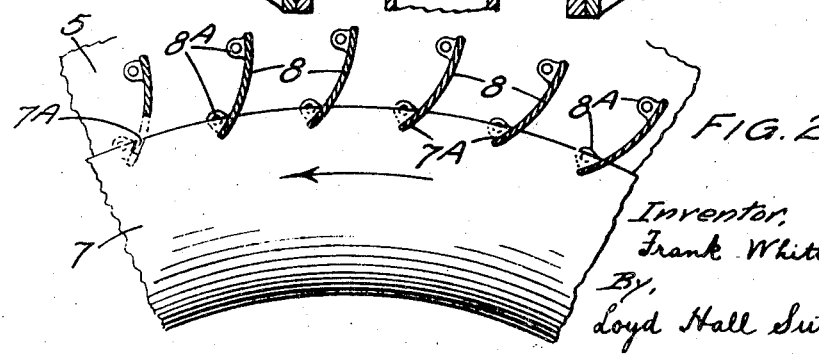
Figure 2 is a sectional view on the line A—B of Figure 1, showing typical guide vanes.

The rotating impeller 1 has radial vanes 2 on each side of a web 3 in the plane of symmetry and rotation. The impeller runs in a casing with side walls 4 which, towards the axis, are flared outwards as at 4A. The vanes 2 have integral axial extensions 2A forming rotating guide vanes, which are pitched or bent in such a way as to accelerate incoming air axially: hence they have a radially increasing pitch angle, referred to the axis of rotation. The intake eyes of the compressor are formed by walls 5, 6, forming part of the stationary structure, the walls 5 being integral or rigid extensions of the wall parts 4A. The walls 6 may be parts of, or rigid with, bearing structures supporting the impeller 1. In the annular air channels forming the intake eyes, there are provided a series of annular cascade rings 7, which may be circumferentially discontinuous for ease of assembly, but which form, in effect, continuous vanes bounding channels for the air, to direct the air which enters radially into the axial direction. These rings 7 are supported by having notches at 7A (Figure 2) which mate with complementary notches in the inner edges of a series of fixed guide vanes 8. The guide vanes 8, some of which are shown in section Figure 2, are secured to the walls 5, 6 by rivets or the like, passing through bent-up lugs 8A of the vanes 8. The vanes 8 being thus secured and being numerous—say about an inch apart—they adequately support the rings 7 with which they are all interlocked by the notches.

At the outer or "entering" edges of the vanes 8, their direction is radial to the impeller axis; at their inner or "leaving" edge their direction is at an angle of (in one particular case) 42° to the radius through the entry edge. From outer to inner edge the vanes 8 are curved to an arc of a circle. The edges of each vane 8 are parallel to the axis. The vanes on each side of the impeller are "handed" the same way, namely that which corresponds to the direction of rotation of the impeller. The arrow in Figure 2 illustrates this direction.

Air entering the compressor through the eyes, is deflected by the vanes 8, which it leaves with a whirl component. Still whirling, it passes through the channels bounded by the walls 5, 6, and the rings 7, being given an axial component thereby so that its resultant motion is, generally speaking, helical. Simultaneously, the value of the whirl component is increased due to the reduction in whirl radius, this increase being the greater at the smaller radius in the plane of entry into the impeller so that the whirl velocity there will vary inversely as the radius.

The design of the vanes 8, that is to say, their chord and curvature, is preferably such as to conform with the condition that the whirl component of velocity of the air is inversely proportional to the radius. A general statement of similar conditions is to be found in my U. S. application Serial No. 245,980, now abandoned, but of which application, Serial No. 458,122, now matured into Patent No. 2,378,372, of June 12, 1945, is a continuation. The rotating guide blade portions 2A of the impeller, have their leading edges (2B) set at such angles that at all radii they engage the relative flow at little or no angle of attack in design conditions of operation having in mind the whirl of this flow before it reaches the edges 2B.

In the described case where rotating intake guide blades 2A are formed by bending extensions of the radial blades 2 of the impeller, and where it is necessary for reasons of stress to leave the root portion 2C of the guide blades 2A unbent, the angular momentum generated by the stationary guide blade 8 is made of such a magnitude having regard to the effect of the radial-axial intake passage that the whirl component of velocity generated is equal to, or only a little different from, the blade speed at the root radius of the intake. The relative flow into the impeller at the root is thereby substantially axial and the condition of small or no relative angle of attack on the rotating guide blades is achieved even at the root where the guide blade is unpitched, as well as at all other radii.

It is estimated that with the arrangement described a compressor with bilateral intakes could have a value of $$\frac{Q}{ND^3}$$

of 1.17 for a pressure ratio of about 2.5 and of about 0.4 for a pressure ratio of about 5, where Q is capacity of free air in cubic feet per second, N is the rotational speed in revolutions per second, and D is the impeller diameter in feet. This is estimated to be about 60% greater than could be achieved without this means, without running into compressibility troubles at the intake eye.

This invention is particularly suitable for use in the types of engines described in my British Patents Nos. 456,980 and 461,887 and U. S. patent application Serial No. 128,167, now matured into Patent No. 2,168,726, of August 8, 1939, in which it is of great importance to obtain the maximum possible through-put in proportion to size and weight.

It is to be understood that the desired condition of whirl velocity varying inversely with radius, could be achieved by using vanes resembling the vanes 8, but set with their edges at an angle to the axis of the impeller, if such vanes be designed with a twist, i. e., with angles of incidence charging along the span of the vanes. But by adopting the expedient that the edges of the vanes are parallel with the said axis, and the channels turn the general direction of flow from centripetal to axial, the vanes can be made of constant section along their spans, which is obviously a great practical advantage.

What I claim is:

1. A centrifugal compressor comprising an impeller with vanes defining substantially radial channels, said vanes each having bends in their leading edges at the entry to the impeller with the angle between said leading edge and the compressor axis increasing with the radius, a casing containing said impeller, walls defining an entry passage to said casing which is initially radial for inward flow of air and finally axial for flow into the impeller, and entry guide vanes supported by said walls and of uniform section and incidence, said entry vanes being disposed axially across the radial region of the entry passage and imparting whirl to the entering air flow to reduce the air velocity relative to the impeller vanes, said entry vanes and impeller bends being constructed and arranged relative to each other so that under design conditions of operation in which the whirl velocity in the plane of entry to the impeller varies inversely with the radius, the leading edges of the impeller vanes engage the relative air flow at substantially no angle of attack at all radii.

2. A centrifugal compressor as defined in claim 1, being of the bilateral type.

3. A centrifugal compressor as defined in claim 1, having a plurality of cascade rings in the passage between the entry vanes and the impeller.

4. A centrifugal compressor comprising an impeller with vanes defining substantially radial channels, said vanes each having bends in their leading edges at the entry to the impeller with the angle between said leading edge and the compressor axis increasing with the radius, a casing containing said impeller, walls defining an entry passage to said casing which is initially radial for inward flow of the air and finally axial for axial flow into the impeller, and entry guide vanes supported by said walls and of uniform section and incidence; said entry vanes being adapted to produce initial whirl of the entering air in the same sense as the rotation of the rotor and the entry passage and impeller bends being constructed and arranged relative to each other and the entry vanes so that under design conditions of operation with the initial whirl imparted by the entry vanes in the same sense as rotation of the rotor, the whirl velocity across the stream caused by the radial-axial form of the entry passage and to the formation of the impeller bends the whirl velocity in the plane of entry to the impeller varies inversely with the radius, the leading edges of the impeller vanes engage the relative air flow at substantially no angle of attack at all radii.

5. A compressor according to claim 1 wherein the guide blades at the roots thereof are directed axially and at increasing radii there is corresponding increase in pitch.

FRANK WHITTLE.

REFERENCES CITED

The following references are of record in the file of this patent:

UNITED STATES PATENTS

| Number | Name | Date |
|---|---|---|
| 879,476 | Krell | Feb. 18, 1908 |
| 978,397 | Rice | Dec. 13, 1910 |
| 1,125,118 | Kerr | Jan. 19, 1915 |
| 1,390,237 | Conder | Sept. 6, 1921 |
| 1,640,784 | Lorenzen | Aug. 30, 1927 |
| 1,931,692 | Good | Oct 24, 1933 |
| 2,129,808 | Bentley | Sept. 13, 1938 |
| 2,135,053 | Rockwell | Nov. 1, 1938 |
| 2,210,155 | Szydlowski | Aug. 6, 1940 |
| 2,305,136 | Campbell | Dec. 15, 1942 |

FOREIGN PATENTS

| Number | Country | Date |
|---|---|---|
| 2,290 | Great Britain | Oct. 6, 1853 |
| 137,274 | Great Britain | Nov. 3, 1919 |
| 503,652 | Great Britain | Apr. 12, 1939 |